O. A. PARKER.
DEMOUNTABLE RIM FOR WHEELS.
APPLICATION FILED APR. 1, 1916.
1,188,200.
Patented June 20, 1916.
3 SHEETS—SHEET 1.
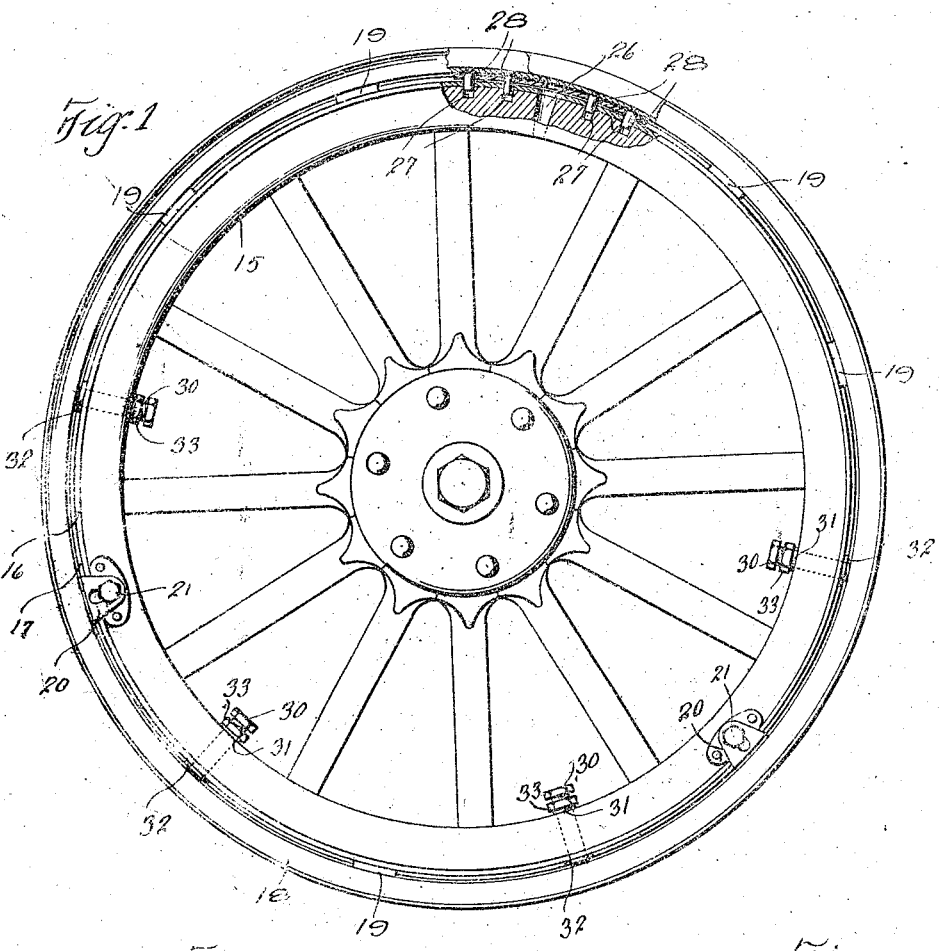
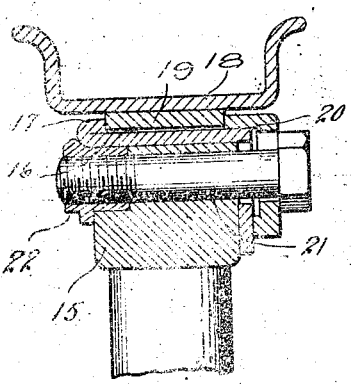
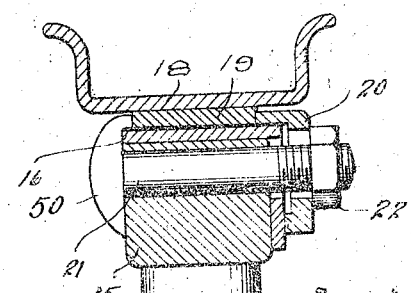
Inventor
Orrel A. Parker
By Hull Smith Brock & West
Attorney

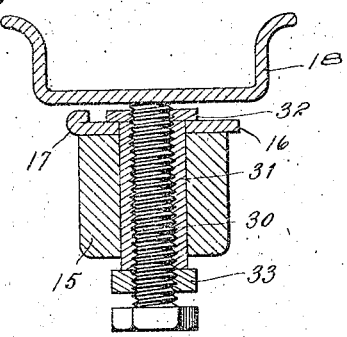
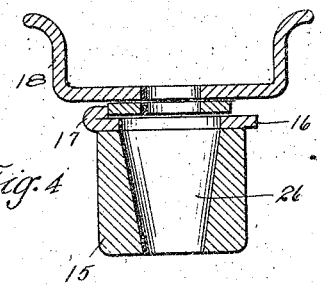
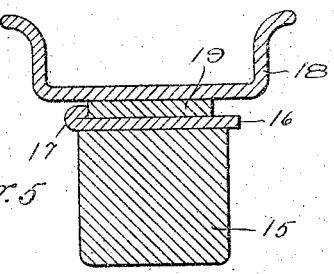
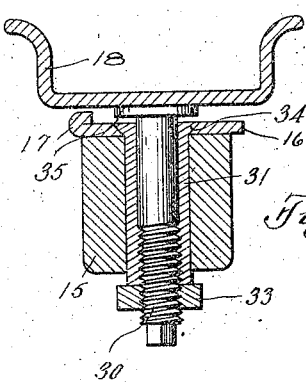
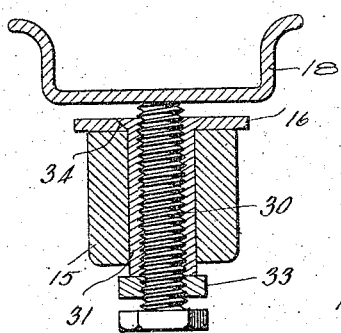
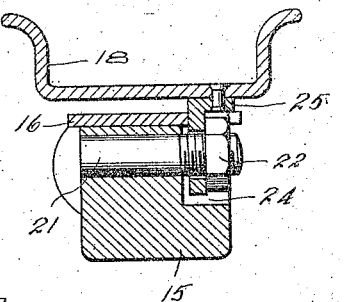
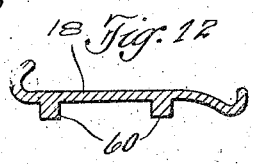

O. A. PARKER.
DEMOUNTABLE RIM FOR WHEELS.
APPLICATION FILED APR. 1, 1916.

1,188,200.

Patented June 20, 1916.
3 SHEETS—SHEET 3.

Inventor
Orrel A. Parker

By Hull Smith Brock & West
Attorney

UNITED STATES PATENT OFFICE.

ORREL A. PARKER, OF CLEVELAND, OHIO.

DEMOUNTABLE RIM FOR WHEELS.

1,188,200.  Specification of Letters Patent.  Patented June 20, 1916.

Application filed April 1, 1916. Serial No. 88,262.

*To all whom it may concern:*

Be it known that I, ORREL A. PARKER, a citizen of the United States, residing at Cleveland, in the county of Cuyahoga and State of Ohio, have invented a new and useful Improvement in Demountable Rims for Wheels, of which the following is a specification.

This invention relates to a demountable tire-carrying rim and means for fastening the same upon the wheel body.

Nearly all demountable tire-carrying rims now in commercial use are used in connection with fastening means which exert at the same point both a radial and lateral pressure upon the rim (such as wedge clamps forced between the felly and rim, or wedge rings forced in by clamps), a considerable degree of skill is required for fastening a rim with such devices, because if skill and care are not exercised the rim is liable to be bolted on out of a true plane with the wheel, and the rim may be drawn off center in the tightening up of the locking elements. If one wedge or clamp is bolted too tight, the demountable rim is usually forced out of the plane of the wheel and eccentric with regard to the wheel center at the same time.

The object of my invention is to obviate these defects, and provide a demountable rim, fastening means, and a wheel body, of such constructions that the rim can be quickly and easily mounted upon the wheel body in a true plane with the wheel, and radially tensioned without danger of unduly distorting the rim and throwing the same off center.

Another object is to provide a construction in which a minimum number of locking elements or fastening devices are necessary to accomplish all of the before mentioned advantageous results, and a still further object is to provide locking elements which shall be devoid of all wedging action, because it is the wedging action, radially and laterally at the same point, which causes the evils above mentioned.

With these, and other objects in view, which will appear as the description proceeds, the invention consists in the novel features of construction and the manner of combining the same, all of which will be fully described hereinafter and set forth in the appended claims.

Figure 7:
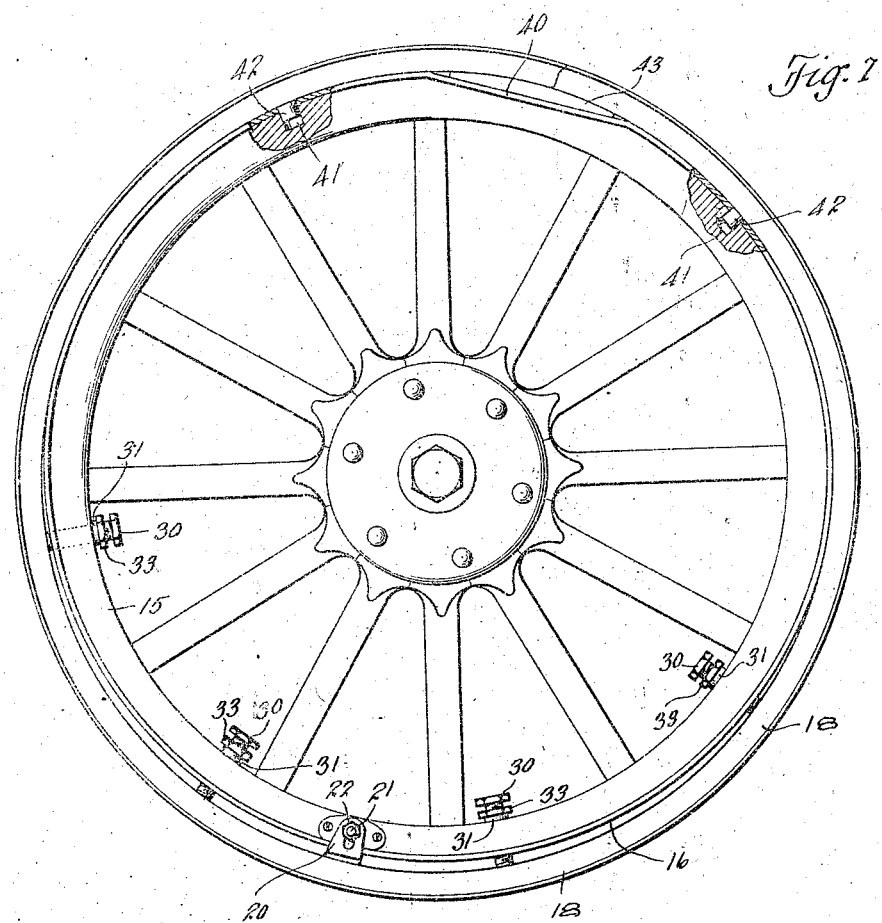
Figure 8:
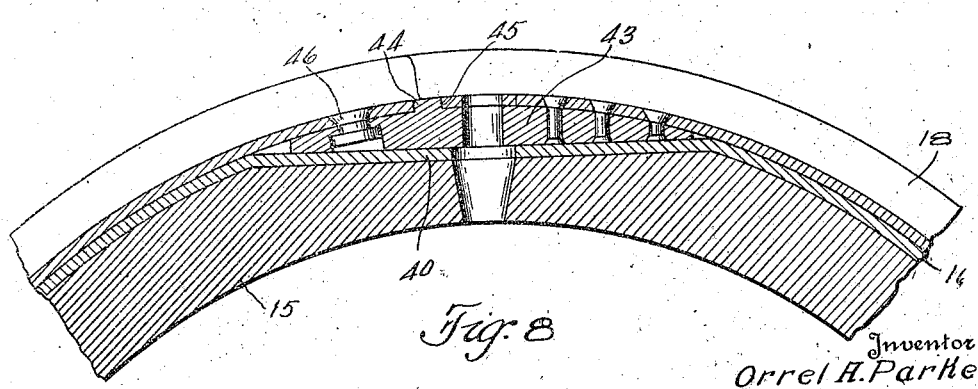

In the drawings, forming a part of this specification,—Figure 1 is a face view of a wheel, partly in section, illustrating the practical application of my invention. Fig. 2 is a cross-sectional detail of the rim, felly and lateral clamping means. Fig. 3 is a cross-sectional view of the rim, felly and radial tensioning means. Fig. 4 is a cross-section taken through the rim and felly at the point of the valve stem opening. Fig. 5 is a cross-section showing the felly and its band and the rim with one of its spacing blocks in contact with the shoulder or stop of the felly band. Fig. 6 is a detail cross-sectional view showing a slightly modified form of tensioning means. Fig. 7 is a face view, partly in section, of a slightly modified form of wheel embodying my invention. Fig. 8 is a longitudinal sectional view of the wheel and rim at the transplit portion of the rim. Fig. 9 is a cross-sectional view illustrating the clamping means used in connection with the wheel illustrated in Fig. 7. Fig. 10 is a cross-sectional view of the tensioning means employed on such wheel. Fig. 11 is a cross-sectional view of a still further modification of the clamping means; and Fig. 12 is a detail sectional view of another modified form of rim.

I have shown my invention applied to the ordinary artillery type of wheel, but it is obvious that the same principles in modified form may be used in connection with other types of wheels. The felly 15 has a metallic felly band 16 which, in practice, is preferably rolled over at its inner edge to provide a lateral stop or shoulder 17 against which the rim with its connected parts can abut and be positively held in the true plane of the wheel body by means of the lateral clamping devices.

The rim 18 may be of the "clencher" or "straight side" type and can be transplit or continuous, and has blocks 19 connected to the inner face thereof at definite points, said blocks being connected in any suitable manner, and having flat inner and outer faces or edges, the inner faces of said blocks being adapted to contact with the stop or shoulder 17 while the outer faces of some of these blocks are engaged by lateral clamping or locking element for the purpose of forcing the rim to its true position and then locking the same thereon. These blocks are of sufficient thickness to occupy the necessary clearance between the felly and rim, and in the present construction this clearance can be considerably less than the clearance necessary in the type of wheels now in common use employing locking elements which have a radially outward and laterally inward wedging action at the same point. The blocks 19 in my construction serve the double purpose of spacing the rim from the felly and also act as positioning means for arranging the rim in its true plane upon the wheel body, as the blocks 19 are always brought into contact with the stop or shoulder 17 and securely held against the same by the clamps 20 arranged upon the bolts 21 which extend through the felly of the wheel.

The clamps 20 are right-angled in form, the horizontal part being shaped to engage the flat edge or face of the block 19, and the vertical portion apertured to receive the bolt, this aperture being preferably elongated so that the clamp 20 can be moved out of the way after the clamp has been loosened, thereby leaving the rim free to be removed from the felly.

The nut 22 can be arranged upon the inner end of the bolt, as shown in Fig. 2, or the nut can be arranged upon the outer face of the wheel, as shown in Fig. 9; and, if desired, the felly can be mortised at 24 to receive the clamp 25 and nut 22, as shown in Fig. 11, the clamp in this construction being connected direct to the rim and fitting into and seating against the felly band; the fastening means shown in Figs. 9 and 11 being used in connection with the wheel and rim illustrated in Fig. 7.

The blocks 19 are preferably spaced at equidistant points around the entire circumference of the rim and as many may be employed as found necessary.

The felly and band are constructed with the usual valve stem opening 26 and dowel recesses 27, the rim being provided with dowels 28 upon opposite sides of the valve stem opening and adjacent thereto and adapted to enter the recesses or sockets 27, thereby properly positioning the rim upon the felly band at this point.

In practice, the rim with the inflated tire thereon is placed upon the wheel body, the valve stem passing through the valve stem opening in the band and felly and the dowels 28 enter the recesses 27, and the lower or opposite portion of the rim is then permitted to swing freely toward the wheel body, and, there being sufficient clearance, the rim will readily fit over the felly band. If there be no obstructions, such as mud, dirt, rust or other foreign substance, the blocks 19 will contact at once with the lateral stop 17; but if for any reason the rim should not fit properly upon the felly band, the clamp 20 can be brought into engagement with the block and, by tightening the nut and bolt, the clamp exerting pressure upon the block will cause the same to move inwardly until a positive engagement is had between the block 19 and the stop 17.

It will be noted, by reference to Fig. 1, that only two lateral clamps are employed, as in practice I have found these to be sufficient, said clamps being arranged at proper points opposite the dowel connections, but it will be understood that any desired number of lateral clamps may be employed and, for a medium sized wheel, six will be found amply sufficient.

After the rim has been properly positioned or centered in its true plane upon the wheel body, I tighten the rim by means of a suitable number of tensioning devices, preferably in the form of a radial bolt 30 working through a sleeve 31 located in the felly, the end of the bolt being flat or straight and engaging the flat and straight inner face of the rim, said bolt being applied to exert a radial pressure or tension upon the rim which, in connection with the spacing blocks 19, serve to bind the rim tightly upon the wheel body.

In Fig. 3 I have shown the sleeve 31 as provided with a head 32 at its outer end and its inner end projects slightly beyond the inner face of the felly and between the end of the bolt and sleeve I arrange a jam or lock nut 33 for the purpose of locking the radial tension bolt after the same has been adjusted to its proper position.

In Fig. 6 I have shown the sleeve 31 with its outer end countersunk at 34 and the end of the bolt 35 enlarged and flattened in order to provide a broad bearing surface against the rim. The lock or jam nut 33 is employed in this construction and operates exactly the same as previously described. By means of the jam nuts 33 all danger of the radial bolts working loose is avoided, but if said bolts should ever become loose the lateral clamping means would be sufficient to maintain the rim upon the wheel body and by simply turning up the tension bolts into locking engagement with the rim, it, the rim, will be immediately restored to its locked and completely fastened condition upon the wheel body.

Instead of making the outer end of the bolt enlarged and flattened, the rim could be made with bearing blocks at these points in order to provide a suitable bearing surface for the end of the screw, the end of the screw and the bearing face of the block being perfectly flat, as in the other constructions previously described.

In the construction shown in Fig. 7, the felly and its band are flattened, as indicated at 40, and in this type of wheel the felly band is preferably devoid of the lateral stop or shoulder. Upon opposite sides of the flattened portion, the felly and its band are formed with dowel recesses 41 to receive the dowels 42 carried by the rim upon opposite sides of the transplit division, and for the purpose of connecting the ends of the transplit rim, I provide a plate 43, which is substantially sector-shaped, the outer face thereof being curved to correspond to the curve of the rim, while the inner face thereof is made straight to correspond with the flattened portion 40 of the felly band. This locking plate 43 is riveted to one end of the rim and projects beyond the dividing cut of the same, and just beyond the valve stem opening this plate is provided with a lug 44 adapted to engage an opening 45 produced in the rim, and, in addition to the lug 44 formed upon the plate 43, a headed stud 46 is attached to the rim and is adapted to engage a diagonal-shaped slot produced in the end of the plate for the purpose of guiding the locking plate into position so as to bring the lug 44 into engagement with the opening 45 and then hold the parts against separation. It will be noted that a plate constructed in this manner completely fills the sector-shaped space between the felly band and rim and has its thickest portion at the point of division in the rim and where strength is most needed. In this type of wheel, the felly for substantially one-half of its circumference (the upper half) is concentric with the rim, but the remaining half (the lower) is slightly eccentric, there being just sufficient clearance to permit the rim to fall freely over the wheel body after the tire valve stem and the dowels have been fitted into their respective openings, and a lateral clamping member, such as illustrated in Fig. 9, will be sufficient to properly position the rim upon the wheel body, the head of the bolt 50 serving as a lateral stop for the block 19, said block being rigidly held in place by the clamp 20, secured by the nut 22. The clearance before referred to is taken up and the rim drawn down tightly upon the upper half of the wheel body and rigidly tightened upon the lower half by means of the radial bolts 30, there being preferably four such bolts employed, arranged at equidistant points, but it will, of course, be understood that any desired number of bolts can be employed.

It will be understood that the illustrations in Figs. 7 and 8, like those on the other figures, are more or less conventional. The dowels and dowel seats, respectively, can be larger or smaller than illustrated and can be of such conformation as is found suitable to permit ready and accurate fitting of the one within the other.

The employment of the sector-shaped plate or block 43, and the flattening of the felly part of the wheel, as at 40, enable me to obviate disadvantageous features that have been incident to wheels with demountable trans-split rims as heretofore constructed. The split rims have required detachably fitted connecting bars or plates overlapping the line of split. And although curved to conform to the curvature of the rim, they have necessitated leaving a space between the inner surface of the rim and the outer surface of the wheel felly band. This space, in turn, has required filling blocks, studs, buttons, plates, or the like, to hold the wheel body and the rim approximately concentrically. In many of these structures this space is also utilized to receive the rim-clamping wedge devices.

By connecting the two ends of the rim at the line of split by the sector-shaped block 43, and flattening to a slight extent the felly part of the wheel, I not only provide a much stronger and lighter joint for the rim ends, but also provide for neatly fitting this joining device to the wheel in such way as to eliminate the open space around the large part of the circle. The number of axially acting clamps, centering and tensioning bolts is reduced and the area over which there is practically perfect fitting of the rim to the felly band is largely increased.

In Fig. 10 I have shown a cross-sectional view of the rim, felly and felly band, with the tensioning means arranged in said felly, the jam nut 33 being employed in this construction also for the purpose of securely locking the radial bolt after the same has been adjusted to its proper position.

Instead of spacing blocks 19, the inner face of the rim can be formed with two spaced ribs 60, this construction of rim being specially adapted for rims provided with "quick detachable" rings or flanges.

It will be understood that various changes can be made in the details of construction of the various parts without departing from the principles of the invention as defined in the appended claims.

From the foregoing description, taken in connection with the accompanying drawings, it will be noted that I provide an exceedingly simple and highly efficient means for quickly connecting and disconnecting a demountable tire-carrying rim to and from the wheel body. By means of the construction herein shown, the rim must necessarily be positioned upon the wheel body in its true plane and the clamping means which are employed to ultimately fasten the rim against lateral movement can be employed during the initial manipulation for the purpose of aiding in the centering of the rim in case obstructions, such as mud, rust, dirt, and the like, are encountered. By means of the radial tensioning devices employed in connection with the lateral clamping and positioning means, the tire is rigidly and properly connected to the wheel body, and owing to the positioning and spacing blocks arranged at the proper points, it is practically impossible to distort the rim during the tensioning operation sufficiently to throw the rim off center.

I know that numerous wheel bodies and demountable rims therefor have been proposed, together with attachments for the wheel bodies for positively moving the rim axially and simultaneously causing outward radial pressure and peripheral tension on the rim. In all cases use has been made of a device or devices embodying wedge surfaces acting in two directions to accomplish the two said purposes simultaneously; that is, to effect rim movement, axially, and simultaneously apply pressure radially. In some cases wedging devices have been used at the inner edge of the wheel periphery, and at the outer edge, means have been placed for simultaneously applying pressure axially and forcing the rim against the inner wedge device, and upward, and outward, along its wedging face. In other cases each wheel body has had at the inner edge the aforesaid wedging or inclined devices, and at the outer edge, has had a second similar wedging device adapted to wedge the rim axially toward the inner wedging device, and also to exert a wedging action outward on the rim to cause peripheral tensioning thereof. In still other cases use has been made of a single wedging device (as a screw bolt with conical tip) so related to the body and the rim that, by a single movement of this single rim device, both the axial movement of the rim and the exerting of radial pressure thereon can be simultaneously effected. I eliminate entirely wedging devices for either of these purposes; all parts of my rim respond to the axial pressure on lines parallel to the axis only. And the parts of the rim contacting with the radially acting devices move rectilineally only.

I believe myself to be the first to have so constructed a wheel body, and attachments, that a demountable rim of any ordinary or suitable form can be secured by two devices, one of which exerts pressure on axial lines (parallel to the axis) only on the rim; the other, independent of the first, exerting pressure on radial lines only, to cause peripheral tension. The first one forces the rim axially as required, at option, and locks it against displacement; the second, with an action irrespective of that of the first, bears radially outward, to an optional extent, against the rim. And I am the first to have provided (a) counterpart inter-engaging stops on the body and the rim to positively stop axial movement at predetermined transverse planes, together with (b) means to apply power axially to the rim without, at any time, causing tension peripherally on any part of the rim, and (c) devices (independent of the last said means) by which the rim metal can be tensioned irrespective of the inter-engagement of the stops.

I claim:

1. The combination with a wheel body and a demountable rim therefor, of means for exerting against said rim lateral pressure only, and means independent of those aforesaid for exerting against it radial pressure only.

2. The combination with a wheel body and a demountable rim therefor, of means for exerting against said rim lateral pressure only and for locking it against movement axially, and means independent of those aforesaid for exerting against the rim radial pressure only.

3. The combination of a wheel body having rim supporting peripheral parts, a demountable rim adapted to be moved axially, rim-moving devices on the body acting axially, means on the body to positively stop axial movement of the rim, and tensioning devices for exerting radial pressure outwardly on the rim, the rim being movable radially independently of the stop and of the tire-moving devices while engaged thereby.

4. The combination of a wheel body having a felly band, radial projections at the edge of the felly band, axially movable radially extending projections at the opposite edge of the felly band adapted to engage a rim, a demountable rim around the felly band and adapted to be moved axially by the movable projections, and adjustable tensioning devices independent of the said projections for exerting outward radial pressure on the rim, the rim being movable radially independently of the said projections while locked axially in position thereby.

5. The combination of a wheel body having rim-supporting peripheral parts, a demountable rim positioned around the peripheral parts, means for stopping axial movement of the rim at a predetermined position, means for moving the rim axially to, and clamping it in, said position, and means operable independently of those aforesaid for exerting on the rim outward radial pressure, the rim being capable of radial movement while normally clamped in said position.

6. The combination with a wheel body having a lateral stop, of a rim having means adapted to engage said stop to position it axially, means for bringing and holding said rim positioning means into contact with the stop and independent tensioning means for tightening the rim upon the wheel body.

7. The combination with a wheel body having a stop, of a demountable rim having a plurality of spacing projections adapted to engage said stop, axially movable clamps adapted to engage said projections, and hold the same in contact with said stop and means independent of the said clamps for exerting outward pressure upon the rim and tightening it upon the wheel.

8. The combination with a wheel body and a demountable rim, one provided with dowels and the other with dowel seats peripherally remote from each other and the rim normally situated closer to the wheel body at points adjacent the said dowels than it is at the diametrically opposite part of the wheel, axially acting clamping means for axially positioning and locking the rim relatively to the wheel at a point substantially diametrically opposite to the dowels, and means independent of the clamping devices for radially tensioning the rim at points adjacent the clamping means.

9. The combination of a demountable transplit rim with a wheel body having a portion of its peripheral part flattened and a sector-shaped joining bar for the ends of the rim, adapted to fit the space of the flattened part of the wheel body, and means for locking the rim in normal position on the wheel body.

10. The combination with a wheel body, one portion thereof being concentric and the remaining portion eccentric, the concentric portion having a valve stem hole, and a dowel recess, of a rim having a dowel adapted to engage said recess, and radial bolts and lateral clamps carried by the wheel body and adapted to engage said rim.

11. The combination with a wheel body having a felly provided with a positive stop at one side thereof, of a demountable tire carrying rim having spacing blocks, the inner and outer faces of which are in radial planes, said blocks being adapted to engage said stop, a laterally movable clamp having an end shaped to engage the outer face of the spacing block and hold the rim upon said wheel body, and radially movable bolts adapted to engage the rim and tension the same.

ORREL A. PARKER.